(No Model.)

R. MARQUART.
METHOD OF SECURING DIAMONDS IN STONE CUTTING TOOLS.

No. 531,051. Patented Dec. 18, 1894.

Witnesses
Chas. H. Smith
J. Staib

Inventor
Rudolf Marquart
per Lemuel W. Serrell
Atty.

UNITED STATES PATENT OFFICE.

RUDOLF MARQUART, OF NEW YORK, N. Y., ASSIGNOR TO HIMSELF AND CHARLES BRANDT, JR., OF SAME PLACE, AND EDWARD B. TOMPKINS, OF BROOKLYN, NEW YORK.

METHOD OF SECURING DIAMONDS IN STONE-CUTTING TOOLS.

SPECIFICATION forming part of Letters Patent No. 531,051, dated December 18, 1894.

Application filed August 3, 1894. Serial No. 519,343. (No specimens.)

*To all whom it may concern:*

Be it known that I, RUDOLF MARQUART, a subject of the Emperor of Germany, residing in the city, county, and State of New York, have invented a new and useful Improvement in the Method of Securing Diamonds and other Stones in Implements for Cutting Stone, of which the following is a specification.

In saws or other implements for dressing or boring stone, where diamonds or similar hard substances are employed for effecting the cutting or abrasion of the stone, it is very necessary that said diamonds be securely held in said implements so that they cannot readily become detached, the usual method of pressing around the stones, the metal of the implement or of a cup to fit therein, being inefficient as the stones readily work out of the setting.

I will herein describe the method as pursued by me in securing diamonds, particularly in teeth for diamond toothed saws for sawing stone, the same method being equally applicable to the setting of diamonds in other implements for working stone.

In carrying out my invention I form a cavity or receptacle in a piece of steel or other metal to receive the diamond or similar cutting stone, the stone is placed in said receptacle which receives almost the entire stone. The metal is then heated quite hot or to a dull red heat while the stone is thus held, and a brazing metal or hard solder is poured over the parts and enters and fills the interstices between the metal and the stone to the surface of the metal. The hot metal and brazing metal unite and while in this heated condition are subjected to an external pressing action to consolidate the metals around the stone, which when the metal cools and contracts is held in place exceedingly secure and firm. This pressing action may be accomplished in any desired manner and by any desired instrumentality. I however prefer a pressing instrument shown and described in an application of like date herewith. The surface of the metal is afterward filed or otherwise dressed off true and smooth so as to more effectually expose either one face or portion of the stone above the surface of the metal, or in addition thereto a face at one edge of the metal, so that the diamond will cut at the side and also at the edge.

Figure 1:
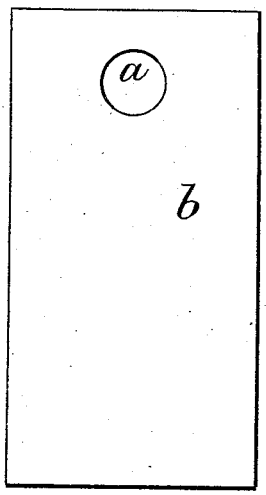
Figure 2:
Figure 4:
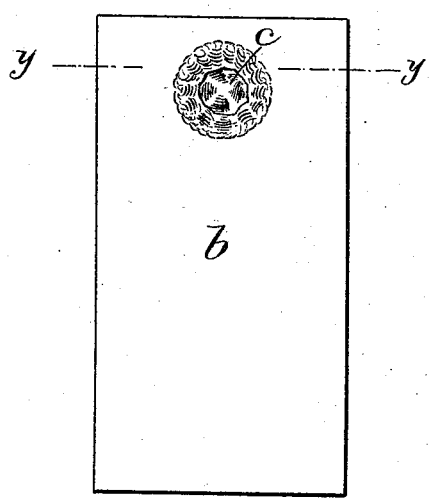
Figure 3:
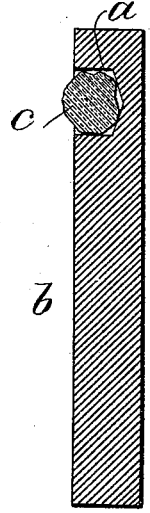
Figure 5:
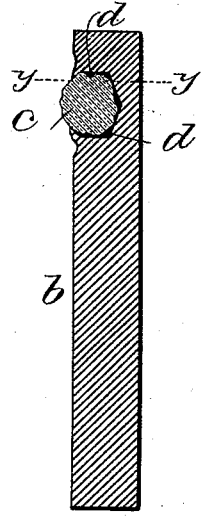

In the drawings, Figure 1 represents by an elevation a piece of metal having a cavity or receptacle. Fig. 2 is a cross section of the same and Fig. 3 is a similar cross section showing the diamond inserted to place. Fig. 4 represents by an elevation the piece of metal as holding and securing the diamond by the edges of the metal being pressed over onto the stone. Fig. 5 is a cross section of the parts in Fig. 4 showing the brazing or solder filling the interstices between the metal body and stone.

The cavity or receptacle *a* is made in the metal *b* composing the tooth or cutting blade or other device by a drill or in any desired manner by suitable tools. The cavity or receptacle is made of a size to receive the diamond to be secured therein and said cavity receives and may approximately conform thereto and in making the cavity a slight wall may be made around the edge of the cavity if desired. The diamond is forced into the cavity and the same receives almost the entire stone. The piece of metal with the stone in place is then heated quite hot or to a dull red heat, and while in this condition a molten brazing metal or hard solder is poured over the stone and flows into and fills the interstices between the metal and the stone and unites with the hot metal. This filling metal is shown at *d*, Fig. 5. While in this condition the hot metal such as brazing metal or solder is thoroughly pressed from without around and over upon the stone so as to insure filling perfectly all the interstices around the stone and inclosing all but a small portion of the stone with metal. This manner of fastening is accomplished by any desired instrumentality or in any desired manner. The parts are then allowed to cool and in cooling contract around the stone, insuring the stone being held rigidly in place. The piece of metal is then shaped for the purpose for which it is intended, the surface at the cutting face of the stone being filed off to make it level and true and to more perfectly expose the cutting face of the stone, and when desired the edge is also filed off on the line $y, y$ of Figs. 4 and 5 to expose one edge of the stone for service.

It will be observed that because of the general rotundity of the uncut diamond there is a body of metal bearing against its surface between the central line of the stone and the exposed point that forms segments of an arch over the stone tending to hold the stone rigidly in place and effectually preventing the same being worked out of its setting.

I claim as my invention—

1. The method herein specified of securing diamonds and other stones in implements for cutting stone, the same consisting in making a cavity or receptacle in a piece of metal, inserting the diamond into the cavity, heating the metal with the stone in place and filling in the interstices around the stone with a molten brazing metal or solder which unites with the metal and then pressing and forcing the hot metal and brazing metal from without around and over upon the stone to securely hold the same in place, substantially as specified.

2. The method herein specified of securing diamonds and other stones in implements for cutting stone, the same consisting in making a cavity or receptacle in a piece of metal, inserting the diamond into the cavity, heating the metal with the stone in place and filling in the interstices around the stone with a molten brazing metal or solder which unites with the metal and then pressing and forcing the hot metal and brazing metal from without around and over upon the stone to securely hold the same in place, and filing off or otherwise finishing one or more surfaces of the metal around and adjacent to the stone for more effectually exposing the surface of the stone for cutting, substantially as set forth.

3. The method herein specified of securing diamonds and other stones in implements for cutting stone, the same consisting in making a cavity or receptacle in a piece of metal, inserting the diamond into the cavity, heating the metal with the stone in place and filling in the interstices around the stone with a molten brazing metal or solder which unites with the metal, substantially as specified.

Signed by me this 18th day of July, A. D. 1894.

RUDOLF MARQUART.

Witnesses:
GEO. T. PINCKNEY,
HAROLD SERRELL.